United States Patent
Kathan et al.

(10) Patent No.: US 12,520,357 B2
(45) Date of Patent: Jan. 6, 2026

(54) METHOD FOR STARTUP OF A SENSOR FOR PROCESS AND AUTOMATION TECHNOLOGY VIA A MOBILE COMMUNICATIONS DEVICE

(71) Applicant: IFM ELECTRONIC GMBH, Essen (DE)

(72) Inventors: Benno Kathan, Kressbronn (DE); Marius Bock, Friedrichshafen (DE)

(73) Assignee: IFM ELECTRONIC GMBH, Essen (DE)

(*) Notice: Subject to any disclaimer, the term of this patent is extended or adjusted under 35 U.S.C. 154(b) by 0 days.

(21) Appl. No.: 19/244,058

(22) Filed: Jun. 20, 2025

(65) Prior Publication Data
US 2026/0006660 A1 Jan. 1, 2026

(30) Foreign Application Priority Data
Jun. 26, 2024 (DE) .......................... 102024118005.6

(51) Int. Cl.
*H04W 4/00* (2018.01)
*H04W 76/14* (2018.01)
*H04W 4/38* (2018.01)
*H04W 4/80* (2018.01)

(52) U.S. Cl.
CPC .............. *H04W 76/14* (2018.02); *H04W 4/38* (2018.02); *H04W 4/80* (2018.02)

(58) Field of Classification Search
CPC .......... H04W 76/14; H04W 4/38; H04W 4/80
USPC ........................................................ 370/329
See application file for complete search history.

(56) References Cited

U.S. PATENT DOCUMENTS

| | | | | |
|---|---|---|---|---|
| 5,410,488 A | * | 4/1995 | Andersen, III | G01B 7/023 702/158 |
| 6,043,774 A | * | 3/2000 | Singh | G01S 13/36 318/52 |
| 6,636,158 B1 | * | 10/2003 | Bando | G01S 19/35 340/8.1 |
| 8,290,746 B2 | * | 10/2012 | Urmanov | G06F 11/0748 714/25 |
| 9,316,513 B2 | * | 4/2016 | Joseph | G06F 3/046 |
| 10,798,547 B2 | * | 10/2020 | Gold | G06Q 30/02 |
| 11,930,431 B2 | * | 3/2024 | Funaki | G08C 17/00 |

(Continued)

FOREIGN PATENT DOCUMENTS

DE 102014106409 A1 5/2014
WO WO-2024249971 A2 * 12/2024 ........... G01S 13/765

OTHER PUBLICATIONS

German decision to grant a patent, dated Apr. 1, 2025, with English translation, 6 pages.

(Continued)

*Primary Examiner* — Marceau Milord
(74) *Attorney, Agent, or Firm* — LEASON ELLIS LLP

(57) ABSTRACT

A method starts up a sensor for process and automation technology, in which as many tasks and computing processes as possible are outsourced to a mobile communications device such as a smartphone during configuration for mobile communication, and then a finished, locally optimal configuration of the mobile communications connection is transferred to the sensor in a very energy-efficient manner, preferably via a near-field communication (NFC) connection or a Bluetooth data connection.

4 Claims, 1 Drawing Sheet

(56) References Cited

U.S. PATENT DOCUMENTS

| | | | |
|---|---|---|---|
| 2003/0132746 A1* | 7/2003 | Cox | H01L 21/67259 |
| | | | 324/207.26 |
| 2005/0151719 A1 | 7/2005 | Geddes et al. | |
| 2009/0119065 A1* | 5/2009 | Grichnik | G05B 15/02 |
| | | | 702/182 |
| 2010/0332189 A1* | 12/2010 | Urmanov | G06F 11/0748 |
| | | | 702/186 |
| 2014/0247140 A1* | 9/2014 | Proud | A61B 90/98 |
| | | | 340/870.02 |
| 2015/0004958 A1* | 1/2015 | Wang | H04W 4/38 |
| | | | 455/418 |
| 2016/0057565 A1* | 2/2016 | Gold | H04W 4/023 |
| | | | 455/41.1 |
| 2017/0041744 A1* | 2/2017 | McKay | H04W 4/021 |
| 2017/0272842 A1* | 9/2017 | Touma | A63B 24/0003 |
| 2018/0183661 A1* | 6/2018 | Wouhaybi | G01D 18/00 |
| 2018/0227171 A1* | 8/2018 | Yoshida | H04L 41/0803 |
| 2018/0288586 A1* | 10/2018 | Tran | B33Y 10/00 |
| 2018/0306609 A1* | 10/2018 | Agarwal | G06N 20/10 |
| 2018/0322376 A1* | 11/2018 | Henry | G06Q 10/087 |
| 2019/0378396 A1* | 12/2019 | Poder | G08B 25/001 |
| 2020/0117900 A1* | 4/2020 | Deng | H04L 67/52 |
| 2020/0348662 A1* | 11/2020 | Cella | G05B 19/41865 |
| 2021/0243081 A1* | 8/2021 | Pal | A61B 5/746 |
| 2022/0122449 A1* | 4/2022 | Poder | G08B 25/003 |
| 2023/0121273 A1* | 4/2023 | Poder | G08B 25/001 |
| | | | 340/521 |
| 2023/0412455 A1 | 12/2023 | Pal et al. | |
| 2024/0078892 A1 | 3/2024 | Poder et al. | |

OTHER PUBLICATIONS

German Office Action cited in DE 10 2024 118 005.6, dated Mar. 28, 2025, 5 pages.

* cited by examiner

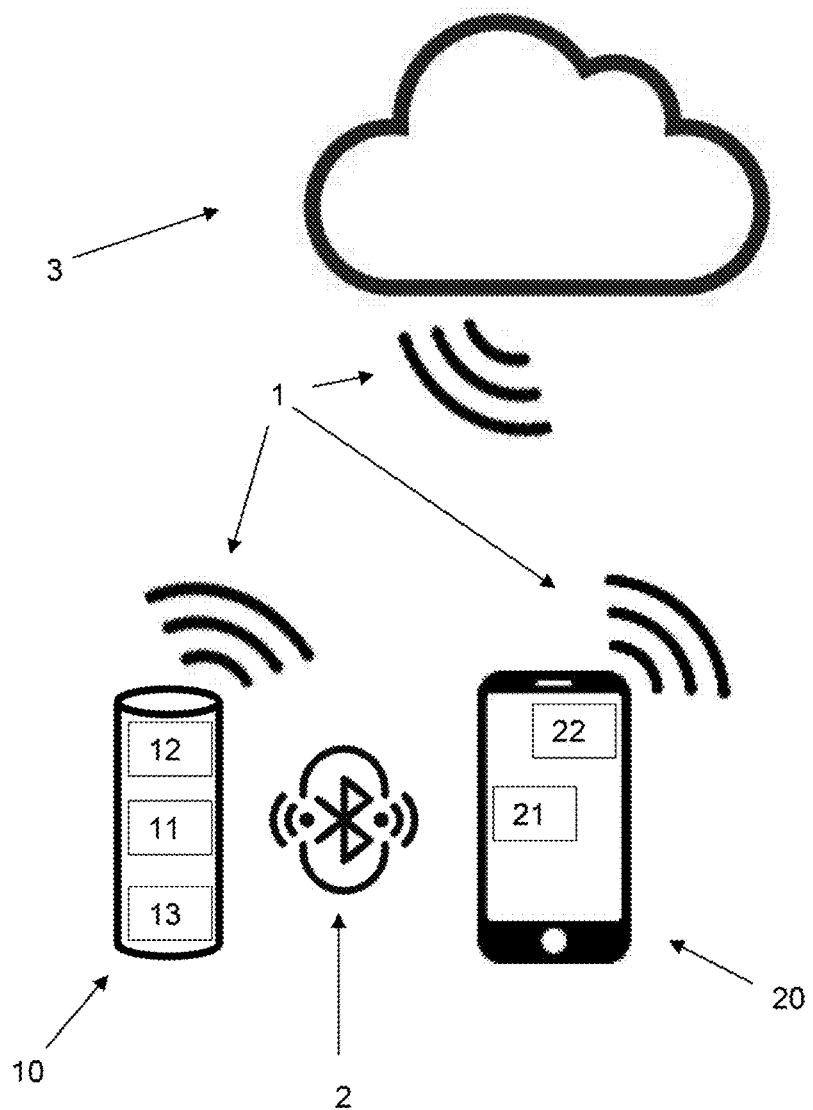

METHOD FOR STARTUP OF A SENSOR FOR PROCESS AND AUTOMATION TECHNOLOGY VIA A MOBILE COMMUNICATIONS DEVICE

CROSS-REFERENCE TO RELATED APPLICATIONS

This application claims priority to German application DE 102024118005.6, filed Jun. 26, 2024, the disclosure of which is incorporated herein by reference in its entity.

The invention relates to a method for startup of a sensor for process and automation technology via a mobile communications device and, in particular, to the simple and energy-efficient configuration of the sensor.

A sensor or measuring device for process and automation technology is used to record a physical quantity and essentially comprises a sensor element, an electronics unit for evaluating and/or processing the measurement signals generated by the sensor element, and an electrical interface via which the measuring device is supplied with energy, and the generated measurement signals can be tapped by a higher-level control unit.

The sensor element, also known as a measurement transducer, is used to record and convert a physical measured value of a process value into a measurement signal. In process technology, the measuring transducer is used in particular to record pressure, temperature, flow, or fill levels of a medium in a container. In addition, there are other applications in automation technology, wherein optical, capacitive, and inductive proximity switches and sensors as well as vibration monitoring are cited here by way of example.

In addition to wired sensors, where the signal transmission and power supply are carried out via a corresponding cable connection, wireless sensors are also known. These have an autonomous power supply, e.g., by means of a battery unit, and transmit the measurement signals to an end system via a wireless data connection. The advantage of such wireless sensors is in particular that they can be used in particularly exposed positions and can be easily retrofitted to existing systems.

From US 2005/0151719 A1, a method and a system for installing and monitoring a proximity sensor are known. The data generated by the sensor can be transmitted from the sensor to a mobile device (e.g., a PDA, a laptop, etc.) with a processor to process the data and a graphical user interface, wherein it is possible for the data to be viewed and manipulated by a user of the mobile device to accurately position the sensor and the target for installation and maintenance. The data can ultimately be stored in a database that the mobile device can access.

From DE 10 2014 106 409 A1, a system for configuring and monitoring a position sensor is known, which is used to determine a position, angular position, rotational speed, and/or speed of a machine component. The system comprises at least the position sensor and a configuration unit for configuring and monitoring the position sensor. The configuration unit is connected to the position sensor via a first data connection and to at least one operating device via a second data connection. The control unit is used to receive, store, and transmit configuration data of the position sensor. The configuration unit can have a web server for data transmission and can be used to control various parameters of the position sensor.

From US 2018/0227171 A1, a sensor registration method is known which comprises generating mapping information that links port information with sensor information. The port information identifies a port of a first communications device to which a sensor is connected, and the sensor information includes a sensor type.

US 2023/0412455 A1 discloses a system for automatic in-situ calibration of sensors in IoT (Internet of Things) systems. This includes emulators that generate calibration target values, and memory units in which the data necessary for calibration are stored. By monitoring sensor outputs during normal operation, calibration losses or data integrity problems can be detected. If such a problem is detected, automatic calibration can be performed.

From US 2024/0078892 A1, a method and devices for managing sensors and data processing devices are known. The reception of an image from a sensor by a mobile device is described. The image contains a QR code. The sensor is identified using the QR code. Based upon the sensor identification, the sensor is added to a list of sensors.

Startup of wireless sensors with autonomous power supply via mobile communications is a challenge, since it requires a lot of energy. The main reasons for this are the intensive computing work of the sensor when searching for and selecting mobile communications providers and mobile communications networks, downloading and installing firmware updates, and dialing into an external end system, e.g., a cloud computer. If these processes are carried out by the sensor itself, they come at the expense of the battery capacity. At the same time, wireless sensors must be particularly energy-efficient to ensure the longest possible operating time.

The object of the invention is to improve the startup of in particular wireless sensors with regard to energy requirements.

The object is achieved according to the invention by a method having the features of claim 1. Advantageous embodiments of the invention are specified in the dependent claims.

The core of the invention is to outsource as many tasks and computing processes as possible during startup to a mobile communications device, e.g., a smartphone, and thus to spare the sensor's battery.

In this case, the invention proceeds from a sensor that comprises at least two communications interfaces and a memory unit. A first communications interface is configured to communicatively connect the sensor to a mobile communications device, and a second communications interface is configured to communicatively connect the sensor to an external end system via a mobile communications network. A memory unit is also provided for storing sensor-specific identification data. The mobile communications device also comprises two communications interfaces, of which a first communications interface is configured to communicatively connect the mobile communications device to the sensor—as a counterpart to the first communications interface of the sensor—and a second communications interface is configured to establish a mobile communications connection.

According to the invention, the startup process comprises the following method steps. First, a wireless data connection is established between the sensor and the mobile communications device via the first communications interfaces, preferably via an NFC or Bluetooth connection. The sensor identification data and the data required for the sensor's mobile communication are transmitted from the sensor to the mobile communications device via this data connection. Using these data, the mobile communications device simulates the sensor and initializes the sensor on the external end system, e.g., a cloud computer, via the mobile communications device's cellular connection. The initialization includes, among other things, the activation or licensing of the sensor, the updating of the sensor to the latest firmware, a naming of the sensor for unique identification and findability, a parameterization of the sensor, e.g., with regard to transmission frequency, etc., and the establishment of a connection between the sensor and the external end system. The mobile communications device then advantageously determines a suitable mobile communications network and/or a suitable mobile communications provider and/or a suitable mobile communications frequency band.

After initialization, the mobile communications device terminates the simulation of the sensor and the mobile communications connection with the external end system and transmits the information about the determined mobile communications network and/or the determined mobile communications provider and/or the determined mobile communications frequency band from the mobile communications device to the sensor via the data connection of the first communications interfaces. Using these data, the sensor finally establishes its own mobile communications connection with the external end system via its second communications interface, without having to go through the energy-intensive self-configuration process itself.

This method significantly improves the startup of a sensor, especially a wireless one, with regard to the load on its battery unit, since all energy-intensive processes are outsourced to a mobile communications device, e.g., a smartphone, and finally a finished, locally optimal configuration of the mobile communications connection is transferred to the sensor in a very energy-efficient manner, preferably via an NFC or Bluetooth data connection.

The invention is explained in more detail below on the basis of an exemplary embodiment with reference to the drawing.

FIG. 1 schematically shows the structure for carrying out the method according to the invention. The starting point is a wireless sensor 10, which has an autonomous power supply by means of a battery unit (not shown in further detail) and is intended to transmit its measurement data via a mobile communications connection 1 to an external end system, in particular a cloud computer. A communications interface 12 is provided for this mobile communication. In order for this mobile communication to be possible, the communications interface 12 requires various configuration data, in particular information relating to the mobile communications network, mobile communications provider, and mobile communications frequency band, which depend upon the location of use of the sensor 10, and the sensor 10 therefore cannot be preconfigured. If the sensor 10 obtains these configuration data itself when establishing the connection, this process is comparatively energy-intensive, which ultimately comes at the expense of the battery capacity, which is originally intended, however, for the longest possible operating time of the sensor 10 in the measuring mode. This is where the method according to the invention comes into play.

Instead of the sensor 10 configuring itself with regard to mobile communication, as many tasks and computing processes as possible are outsourced to a mobile communications device 20, e.g., a smartphone, during startup, thus conserving the battery of the sensor 10.

For this purpose, a wireless data connection 2 is first established between the sensor 10 and the mobile communications device 20 via communications interfaces 11, 21 provided for this purpose, preferably via an NFC or Bluetooth connection. Via this data connection 2, the sensor identification data stored in a memory unit 13 in the sensor 10, as well as the data necessary for the mobile communication of the sensor, in particular the data of a SIM card, are transmitted from the sensor 10 to the mobile communications device 20. Based upon these data, the mobile communications device 20 simulates the sensor 10 and initializes the sensor 10 on the external end system 3 via the mobile communications connection 1 of the mobile communications device 20. In this case, the mobile communications device 20 advantageously determines a suitable mobile communications network and/or a suitable mobile communications provider and/or a suitable mobile communications frequency band for the sensor 10.

With respect to the external end system 3, the mobile communications device 20 acts to a certain extent as if it were the sensor 10 itself, and then searches for the best configuration, as if the sensor 10 itself were establishing the mobile communications connection.

The determined configuration data regarding the mobile communications network, mobile communications provider, and mobile communications frequency band are then transmitted from the mobile communications device 20 to the sensor 10 via the wireless data connection 2, so that the sensor 10 or its communications interface 12 provided for mobile communication is ultimately configured as if the sensor 10 had retrieved these configuration data itself when establishing the mobile communications connection. With these configuration data, the sensor 10 can then establish its own mobile communications connection 1 with the external end system 3 directly via the communications interface 12 and switch to the intended (measurement) operating mode.

LIST OF REFERENCE SIGNS 1 mobile communications network
2 wireless data connection
3 external end system, cloud computer
10 sensor
11 first communications interface of the sensor
12 second communications interface of the sensor
13 memory unit
20 mobile communications device, smartphone
21 first communications interface of the mobile communications device
22 second communications interface of the mobile communications device

The invention claimed is:

1. A method for startup of a sensor for process and automation technology,
wherein the sensor comprises at least two sensor communications interfaces and a memory unit,
wherein a first sensor communications interface is configured to communicatively connect the sensor to a mobile communications device, and a second sensor communications interface is configured to communicatively connect the sensor to an external end system via a mobile communications network, and sensor identification data of the sensor are stored in the memory unit,
wherein the mobile communications device comprises two mobile communications interfaces, of which a first mobile communications interface is configured to communicatively connect the mobile communications device to the sensor, and a second mobile communications interface is configured to establish a mobile communications connection through the mobile communications network, the method comprising:
- establishing a wireless data connection between the sensor and the mobile communications device via the first sensor communications interface and the first mobile communications interface;
- transmitting the sensor identification data and the data necessary for the mobile communication of the sensor from the sensor to the mobile communications device;
- simulating, using the mobile communications device, the sensor on the basis of the received data and determining a suitable mobile communications network and/or a suitable mobile communications provider and/or a suitable mobile communications frequency band;
- initializing the sensor on the external end system via the mobile communications connection of the mobile communications device;
- terminating, using the mobile communications device, the simulating of the sensor and the mobile communications connection with the external end system and transmitting the information about the determined mobile communications network and/or the determined mobile communications provider and/or the determined mobile communications frequency band from the mobile communications device to the sensor via the wireless data connection; and
- establishing a mobile communications connection between the sensor and the external end system via the second communications interface of the sensor on the basis of the information previously transmitted by the mobile communications device regarding the mobile communications network and/or mobile communications provider and/or mobile communications frequency band.

2. The method according to claim 1,
wherein the wireless data connection is a near-field communication connection or a Bluetooth connection.

3. The method according to claim 1,
wherein the mobile communications device is a smartphone or a tablet computer.

4. The method according to claim 1,
wherein the external end system is a cloud computer.

* * * * *